United States Patent [19]
Grove

[11] 3,874,473
[45] Apr. 1, 1975

[54] POWER STEERING APPARATUS FOR TOWING

[75] Inventor: John L. Grove, Greencastle, Pa.

[73] Assignee: Fulton Industries, Inc., McConnellsburg, Pa.

[22] Filed: Oct. 5, 1973

[21] Appl. No.: 404,046

[52] U.S. Cl. .............................. 180/79.2 R, 91/437
[51] Int. Cl. ............................................... B62d 5/08
[58] Field of Search........ 180/79.2 R; 280/463, 103, 280/90; 91/437

[56] References Cited
UNITED STATES PATENTS
| | | | |
|---|---|---|---|
| 2,874,793 | 2/1959 | Wagner............................ | 180/79.2 R |
| 3,114,426 | 12/1963 | Larsen............................ | 180/79.2 R |

Primary Examiner—David Schonberg
Assistant Examiner—John A. Pekar
Attorney, Agent, or Firm—Irvin A. Lavine

[57] ABSTRACT

A vehicle hydraulic power steering system is provided, having a diversion valve to facilitate high speed towing with the power steering system pump inactive. A tow bar has the tie rods of two dirigible wheels connected to it, and is swung in a horizontal plane in the power steering mode by a linear hydraulic motor: the hydraulic motor is controlled by a steering valve supplied with pressure fluid from a pump. In the towing mode, the tow bar drives the hydraulic motor as a pump, and a diversion valve permits circulation of hydraulic fluid between the opposite sides of the piston of the hydraulic motor and a reservoir, through restricted passages in the diversion valve to provide damping of dirigible wheel motion.

13 Claims, 2 Drawing Figures

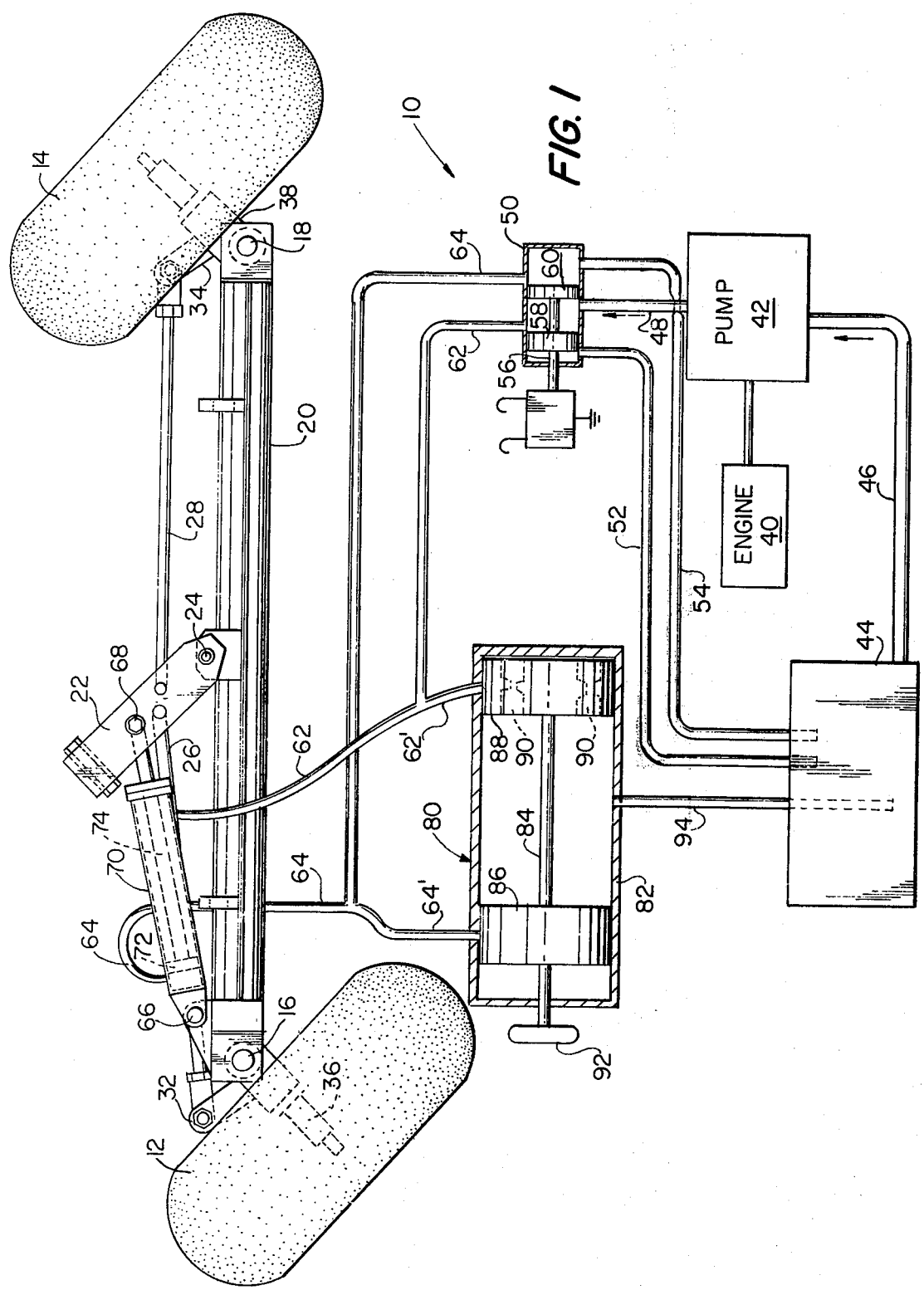

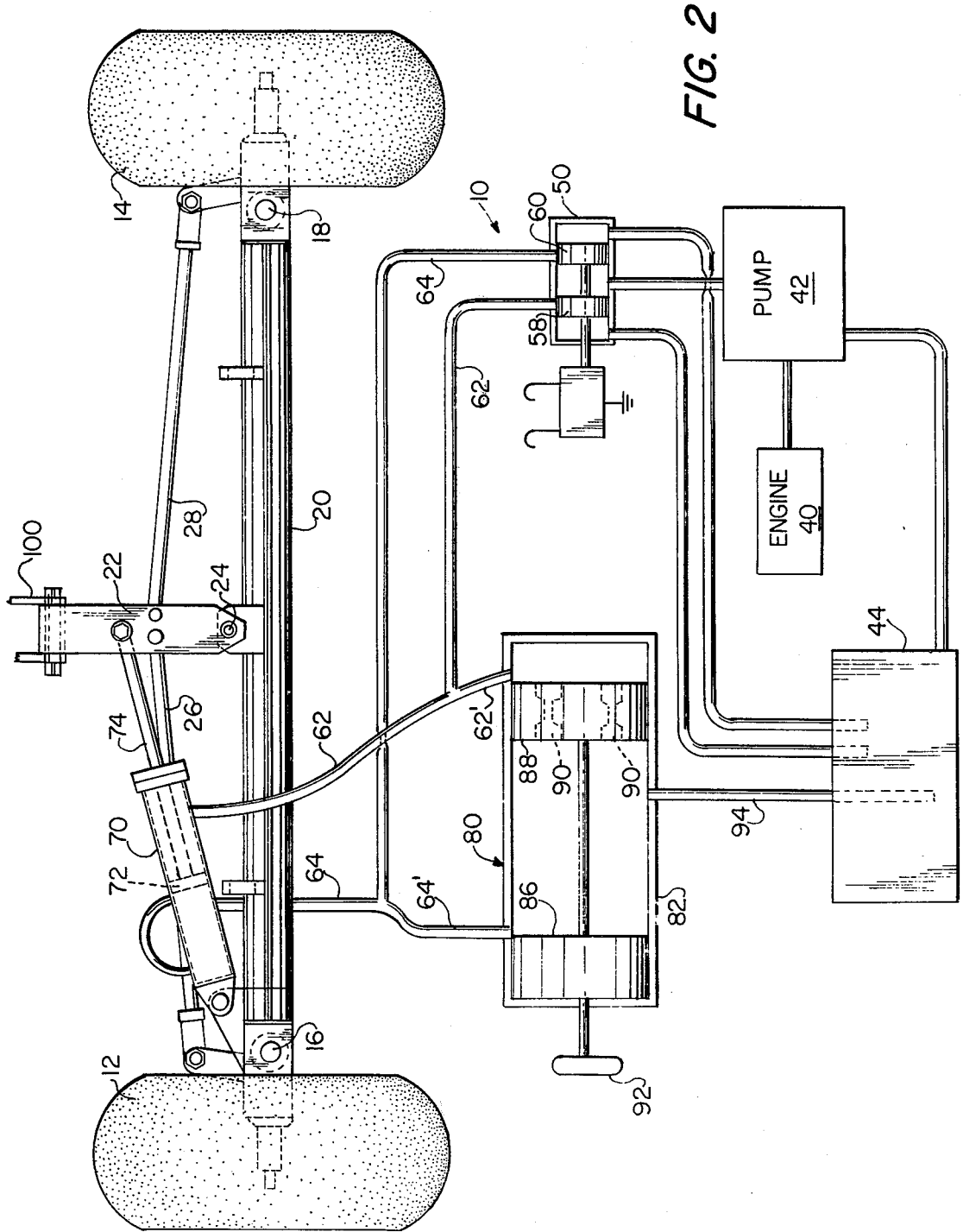

POWER STEERING APPARATUS FOR TOWING

BACKGROUND OF THE INVENTION

The present invention relates to power steering apparatus for vehicles, and more particularly to such apparatus which is convertible for towing.

One type of vehicle which has recently found wide acceptance is the aerial lift platform apparatus. This equipment includes a chassis with an internal combustion engine for supplying power to driving wheels, usually through a hydraulic motor system. Dirigible steering wheels are provided on the chassis, and the chassis supports a boom which is pivotally connected to it for vertical movement about a horizontal axis, the boom preferably being extensible, and carrying at its outer end a platform for supporting a workman. Controls are provided on the platform for manipulation of the boom, and for controlling the driving and stopping of the vehicle, as well as the steering of the dirigible steering wheels thereof. Such a machine is disclosed, for example, in Grove U.S. Pat. No. 3,776,367.

Such vehicles, among others, are often required to be towed from one location to the other, and then operated, in the above described manner, at each location. During towing, the engine is dormant, and therefore the pumps for hydraulic systems which are driven by the engine are also dormant, or inactive. Since the pump supplying hydraulic fluid to the power steering system was inactive, during towing, and since the steering valve, placed in the hydraulic steering system between the pump and a hydraulic steering motor, was in the neutral position, it was not possible for fluid to flow into and out of the hydraulic steering motor, and therefore the dirigible steering wheels would be locked in the straight ahead position, unless provision was made for overcoming this deficiency. Accordingly, in practice, the hydraulic motor was mechanically disconnected from the dirigible steering wheels, as by removing a connecting pin. This was done in order to facilitate towing, and to minimize tire wear, during turning movement. An example of a power steering system in which a connecting pin is removed to place the system in the towing mode is shown in Larson Pat. No. 3,114,426.

While the mechanical disconnection of the hydraulic steering motor from the dirigible steering wheels was an improvement, it was found that where relatively high speed towing was undertaken, the towed vehicle did not function satisfactorily, in that the dirigible steering wheels tended to vibrate or oscillate, and the vehicle tended to "fish tail," actions which were not desirable, and which limited the speed at which towing could be accomplished, with convenience and safety.

In a known hydraulic steering apparatus with provision for self-steering of the vehicle while it was being towed, a hydraulic steering system was provided including a main pump, a steering motor, a steering pump connected to the steering wheel, and a spool valve which was actuated under hydraulic pressure, if hard turning was encountered, so as to enable the main pump to assist the steering pump. This apparatus provided, however, a steering motor which had a pair of piston rods extending from it, one at either end, and did not have provision for the addition of make-up oil in the towing mode, to be supplied to the system from a reservoir.

SUMMARY OF THE INVENTION

A vehicle is provided having a hydraulic power steering system, including a pair of dirigible steering wheels mechanically connected for conjoint movement of tie rods which are connected to a horizontally swingable tow bar. A steering motor is mechanically connected to the tow bar, and is hydraulically connected to a pump through a steering valve. The steering valve is remotely operated, as by a solenoid, and has a neutral position and two end positions, for moving the steering motor in either the extending or retracting manner, to effect movement of the steering wheels. The hydraulic motor is a linear motor having a piston rod extending from one end thereof. A diversion valve is provided, including a housing and a spool therein. A first conduit connects the diversion valve with one side of the hydraulic steering motor and a second conduit connects the diversion valve with the other side of the hydraulic steering motor. A third conduit connects the diversion valve with a reservoir. In its closed position, the lands of the spool of the diversion valve close off the conduits extending to the steering hydraulic motor, and in the open position thereof, these conduits are permitted to communicate with the interior of the diversion valve housing. One of the lands, which is intermediate the openings for the conduits to the hydraulic steering motor in the open position of the diversion valve is provided with one or more restricted passages, so that in the open position, hydraulic fluid may flow from one side of the hydraulic steering motor, into the diversion valve housing, through the passages in the noted land of the spool, and thence back to the other side of the hydraulic steering motor; in the open position, the conduit to the reservoir is in communication with the interior of the housing of the diversion valve, so that make up fluid can be added to or withdrawn from the above noted system, to or from the reservoir, as necessary. Vibration or oscillation of the dirigible wheels is dampened, due to the restricted fluid passages through one land of the diversion valve.

Among the objects of the present invention are to provide a vehicle power steering system which is readily convertible for towing. Another object of the present invention is the provision of a vehicle power steering system having a distribution valve which can be actuated conveniently to place the system in the towing mode.

A still further object of the present invention is to provide a vehicle power steering system having an operating mode and a towing mode, with dampening of wheel movement when in the towing mode.

Other objects and many of the attendant advantages of the present invention will be readily understood from the following specification and drawings.

BRIEF DESCRIPTION OF THE DRAWING

FIG. 1 is a view of a power steering apparatus in accordance with the present invention, in the power steering mode.

FIG. 2 is a view similar to FIG. 1, in the towing mode.

DESCRIPTION OF THE PREFERRED EMBODIMENT

Referring now to the drawings, wherein like or corresponding reference numerals are used for like or corresponding parts throughout the several views, there is shown in FIG. 1 a vehicle power steering system generally designated 10, and including a pair of dirigible wheels 12 and 14, mounted for rotational movement about generally vertically extending bearings 16 and 18. The bearings are supported by an axle, such as 20. Pivotally connected to the axle 20 is a tow bar 22, swingable in a horizontal plane, on the pivot 24. Tie rods 26 and 28 have their ends pivotally connected to the tow bar 22, and to steering levers 32 and 34 connected respectively to the axles 36 and 38 of the respective wheels 12 and 14.

An engine 40, which may be the main motive source of the vehicle, is connected to the pump 42 of the power steering system, pump 42 drawing hydraulic fluid from a reservoir 44 through a conduit 46, and directing the fluid through conduit 48 to a solenoid-operated steering valve 50. Steering valve 50 has ports communicating with return conduits 52 and 54, which lead to the reservoir 44, and internally the steering valve 50 comprises a spool 56 having a pair of spaced lands 58 and 60. When in the neutral position, as shown in FIG. 2, the lands 58 and 60 will close off communication with a pair of conduits 62 and 74, which communicate with the hydraulic steering motor 70. The motor 70 is a linearly extending, double acting hydraulic motor, having a cylinder pivotally connected at 66 to a fixed support, i.e., an extension of the axle 20. The motor 70 is provided with a piston 72, the piston rod 74 of which is pivotally connected at 68 to the tow bar 22.

In the position shown in FIG. 1, the solenoid-actuated steering valve 50 has been actuated, so as to move the spool 56 thereof to the left, permitting fluid from pump 42 and conduit 48 to pass through the steering valve 40 into the conduit 62, and thence to the right side of the motor 70, forcing the piston 72 to the left. Fluid exhausted from the left side of piston 72 passes by way of conduit 64 into the steering valve 50, and thence through return conduit 54 to the reservoir 44. This movement of the hydraulic steering motor 70 has caused the tow bar 22 to pivot about the pivot 24, to thereby cause the tie rods 26 and 28 to move the wheels 12 and 14 to the left.

A diversion valve 80 is provided, including a housing 82, and a spool 84 including a land 86, and a land 88, the latter of which is provided with one or more restricted-flow passages 90. The spindle of the spool 84 extends outwardly of the housing 82, for manipulation by a handle 92. A conduit 64' connects a port in housing 82 with the conduit 64, and a conduit 62' similarly connects another port in the housing 82 with the conduit 62. Both of these ports are closed by the lands 86 and 88 of the spool 84 when the diversion valve 80 is in the closed position thereof as shown in FIG. 1. A conduit 94 provides communication between the reservoir 44 and the interior of valve 80, entering the housing 82 at a position intermediate the ends thereof.

Referring now to FIG. 2, there is shown the vehicle power steering system 10, when in the towing mode. The structure shown in FIG. 2 is essentially the same as that shown in FIG. 1, with the exception that there has been connected to the tow bar 22 a towing structure generally designated 100, and shown broken away. Since the engine 40 is inactive, the pump 42 is also inactive, and the steering valve 50 is in its neutral position, so that it will be seen that land 58 closes off the conduit 62 and land 60 closes off conduit 64. The diversion valve, which is preferably a manually operated valve, has been moved from the closed position shown in FIG. 1 to the open position. In this position, communication is established from the left side of the motor 70 through the conduits 64 and 64' into the interior of motor 70 through the conduits 64 and 64' into the interior of the housing 82, and thence through the conduit 94 to the reservoir 44, communication also being established through the restricted-flow passages 90 in the land 88, conduit 62' and conduit 62, to the right side of motor 70. The wheels 12 and 14 are shown in the neutral or straight-ahead position, and it will be appreciated that the piston 72 of motor 70 is approximately mid-way of its possible range of travel. In this condition, the volume within the motor 70 to the left of piston 72 will be somewhat greater than the volume to the right of piston 72, due to the volume of piston rod 74. Accordingly, when the towing vehicle (not shown) makes a turn to the left, the piston 72 will be moved to the left, forcing hydraulic fluid through the conduit 64, due to the decrease in the space in the motor 70 to the left of piston 72. As will be appreciated, the space in the motor 70 to the right of piston 72 will be increased, but for a given movement of the piston 72, the decrease in volume to the left of piston 72 will be greater than the increase in volume in the motor to the right of piston 72, due to the volume of piston rod 74. Consequently, the fluid flowing from the left side of motor 70 through the conduits 64 and 64' will enter into the diversion valve 80, and the necessary proportion of that fluid will flow through the land 88, and thence through the conduits 62' and 62 to the right side of motor 70. A volume of fluid equivalent to the volume of that portion of piston rod 74 which has moved into the motor 70 will pass through the conduit 94 to the reservoir 44.

Conversely, should the towing vehicle cause the wheels 12 and 14 to turn to the right, the piston rod 74 will partially move or extend out of the motor 70, causing the piston 72 to force a quantity of hydraulic fluid from the right side of the motor 70, through the conduits 62 and 62' into the housing 82. This quantity of fluid will pass through the land 88, and thence through conduits 64' and 64, into the left side of motor 70. In addition, a "make-up" quantity of fluid will be drawn through conduit 94 into the housing 82, from reservoir 44, and this quantity will be equivalent in volume to the volume of the portion of piston rod 74 which has been moved out of the motor 70.

During travel of the towed vehicle at highway speeds, the wheels 12 and 14 may vibrate or oscillate. This could occur, for example, when a bump or rut is struck by one or both of the wheels 12 and 14. Such movement will act through tie rods 26 and 28 to cause movement of the piston rod 74, which in turn will tend to force hydraulic fluid from one end or the other of motor 70, in a somewhat instantaneous manner. Fluid will be urged to flow in the external circuit around motor 70, including the conduits 64, 64', the diversion valve 80, including the restricted-flow passages 90, and and the conduits 62, 62'. Due to the fact that the noted passages in land 80 are restricted flow passages, there will result a dampening action, tending to reduce the vibration or oscillation of the wheels 12 and 14. As will be appreciated, such action is desirable where the various connections in the mechanical linkage system, including, for example, in the connections of the tie rods 26 and 28, are somewhat loose, or provided with some degree of "play."

The valve 80 is placed at a convenient location on the vehicle preferably adjacent tow bar 22, and its manual operation may be readily and easily accomplished. The relative sizes of the components as shown on the drawing are not necessarily accurate.

There has been provided a vehicle power steering system which is readily convertible for towing of the vehicle, there being provided a vehicle power steering system including a single pump which is inactive in a towing mode, and which includes a simple diversion valve which may be manually actuated to place the system in the towing mode, from the power steering mode. Further, the vehicle power steering system herein disclosed provides for dampening of any wheel vibration or oscillation movement which may be generated during towing of the vehicle, the system being not only more convenient than the hereinbefore utilized connecting pin removal systems, but also avoiding undesirable "fish tailing" of the vehicle when in the towed mode.

It will be obvious to those skilled in the art that various changes may be made without departing from the spirit of the invention, and therefore the invention is not limited to what is shown in the drawings and described in the specification but only as indicated in the appended claims.

I claim:

1. In combination:
   a. a vehicle power steering system comprising
      i. dirigible wheel means,
      ii. a horizontally swinging tow bar,
      iii. means connecting said tow bar and said wheel means for conjoint movement,
      iv. hydraulic motor means mechanically connected to said tow bar,
      v. a pump hydraulically connected to said motor means,
      vi. steering control valve means for selectively controlling the flow of fluid from said pump to said motor means, and
   b. selectively actuable hydraulic means connected to said system for permitting in one position thereof fluid forced by said motor means when said wheel means are steered by said tow bar and said pump is inactive to flow from one side of said motor means to the other side thereof and to and from a reservoir.

2. The combination of claim 1, wherein said hydraulic motor means comprises a cylinder and piston.

3. The combination of claim 2, said hydraulic motor means having a single piston rod extending from said piston and outwardly of said cylinder.

4. The combination of claim 1, wherein said hydraulic means comprises a valve, conduits connecting said valve with said hydraulic motor, and a conduit connecting said valve with said reservoir.

5. The combination of claim 4, said valve comprising means in a closed position thereof to prevent the flow of fluid in the conduits connected thereto and to said hydraulic motor.

6. The combination of claim 5, said last mentioned means in an open position thereof providing communication therethrough.

7. The combination of claim 5, said last mentioned means in an open position thereof providing restricted communication therethrough.

8. The combination of claim 4, said valve comprising a housing, a spool in said housing having a pair of spaced land means for closing communication between the interior of said housing and a said conduit connected to said hydraulic motor in the closed position of said valve.

9. The combination of claim 8, and restricted passage means in said spool providing restricted flow therethrough.

10. The combination of claim 8, wherein said pair of land means each closes communication between the interior of said housing and a said conduit connected to said hydraulic motor in the closed position of said valve.

11. A hydraulic power steering system for a vehicle to be operated in a power steering mode and in a towing mode, wherein dirigibly mounted steering wheels are connected by tie rods to a tow bar pivotal about a substantially vertical axis, a hydraulic steering motor is connected to said tow bar, and a motor-driven pump supplies hydraulic fluid to said hydraulic steering motor through a steering valve, the improvement comprising:
   a. valve means and conduit means,
   b. said conduit means hydraulically communicating said valve means with said steering motor for transmitting fluid between said valve means and said fluid motor upon movement of the latter in the towing mode, said conduit means further hydraulically communicating said valve means and a reservoir,
   c. said valve means comprising means in one position for blocking flow in said conduit means to said motor and in a second position for permitting flow therethrough to and from said steering motor and said reservoir.

12. The apparatus of claim 11, said valve means comprising a spool and spaced land means for blocking flow in said conduit means in the one position of said valve.

13. The apparatus of claim 12, said steering motor comprising a cylinder, a piston and a piston rod extending from one side thereof, a first said conduit communicating said valve housing with the side of said motor having said piston rod, and passage means extending through said land means for blocking flow in said first conduit, said passage means providing communication through said land means for communicating both sides of said steering motor with said reservoir in the second position of said valve means.

* * * * *